US012541363B2

(12) United States Patent
Van Der Sman et al.

(10) Patent No.: US 12,541,363 B2
(45) Date of Patent: Feb. 3, 2026

(54) SYSTEMS AND METHODS FOR A BIFURCATED MODEL ARCHITECTURE FOR GENERATING CONCISE, NATURAL LANGUAGE SUMMARIES OF BLOCKS OF CODE

(71) Applicant: Capital One Services, LLC, McLean, VA (US)

(72) Inventors: Benjamin Van Der Sman, Arlington, VA (US); John E. Jones, IV, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 340 days.

(21) Appl. No.: 18/455,701

(22) Filed: Aug. 25, 2023

(65) Prior Publication Data

US 2025/0068417 A1     Feb. 27, 2025

(51) Int. Cl.
*G06F 8/73*     (2018.01)

(52) U.S. Cl.
CPC ...................... *G06F 8/73* (2013.01)

(58) Field of Classification Search
CPC .......................................... G06F 8/73
USPC ........................................ 717/123
See application file for complete search history.

(56) References Cited

U.S. PATENT DOCUMENTS

| 10,049,148 | B1 * | 8/2018 | Fang ........................ G06F 16/23 |
| 2022/0382527 | A1 * | 12/2022 | Wang ...................... G06N 3/084 |
| 2023/0065870 | A1 * | 3/2023 | Pyzow ..................... G06N 3/10 |
| 2025/0245253 | A1 * | 7/2025 | Mandal ................ G06F 16/3344 |

OTHER PUBLICATIONS

Xing Hu, Deep Code Comment Generation, May 28, 2018, ICPC '18: Proceedings of the 26th Conference on Program Comprehension pp. 200-210 (Year: 2018).*

* cited by examiner

*Primary Examiner* — Wei Y Mui
*Assistant Examiner* — Amir Soltanzadeh
(74) *Attorney, Agent, or Firm* — Foley & Lardner LLP

(57) ABSTRACT

Systems and methods are described for generating code summaries using bifurcated model architectures. The bifurcated model architecture may comprise a first model that generates code summaries based on native code script, and the second model may compare, de-duplicate, and/or categorize the code summaries into clusters that perform the same or similar functions. That is, the systems and methods may comprise a first model (e.g., a large language model) to predict new content (e.g., a code summary for a given native script code). The outputs of the first model are then inputted into a natural language processing (NLP) model to compare the code summaries. For example, the first model of the bifurcated architecture performs a crucial pre-processing step that prevents the NLP model from generating cluster descriptions that are specific to semantic structures, programming languages, and/or code formatting.

20 Claims, 5 Drawing Sheets

SYSTEMS AND METHODS FOR A BIFURCATED MODEL ARCHITECTURE FOR GENERATING CONCISE, NATURAL LANGUAGE SUMMARIES OF BLOCKS OF CODE

BACKGROUND

Computer programming is typically a team-based activity in which the responsibilities for the features and source code necessary to produce a given project (e.g., a software application) are shared among team members. To facilitate this team activity, team members may submit contributions to the project to a distributed version control system. This system may include a codebase that features a full history of the project that is mirrored on every contributor's computer. The system may enable automatic management of different branches of the project as well as the merging of different contributions. Accordingly, project management for computer programming often involves multiple team members and service providers working in a distributed fashion sharing multiple versions of a single codebase for the project.

As a byproduct of this distributed fashion, different teams are often working to generate code that may perform the same or similar function. Because of this, teams may often spend time and resources to generate the same (or similar) code, thus resulting in redundant work being done. However, sharing native code scripts for one or more applications, which may perform one or more functions in those applications, is difficult as there is no common taxonomy and/or lexicography for organizing and assembling native code scripts.

In recent years, the use of artificial intelligence, including, but not limited to, machine learning, deep learning, etc. (referred to collectively herein as "artificial intelligence models," "machine learning models." or simply "models") has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time consuming. Additionally, data that is obtained may need to be categorized and labeled accurately, which can be a difficult and time-consuming manual task. Second, results based on artificial intelligence can be difficult to review as the process by which the results are made may be unknown or obscured. This obscurity can create hurdles for identifying errors in the results, as well as improving the models providing the results. These technical problems may present an inherent problem with attempting to use an artificial intelligence-based solution in organizing and assembling native code scripts.

SUMMARY

Systems and methods are described herein for generating code summaries. In particular, the systems and methods are described for generating summaries in a concise, natural language format based on blocks of native scripts. To do so, the systems and methods use a bifurcated model architecture, which overcomes the technical problems stated above.

For example, as stated above, applying artificial intelligence solutions to practical applications is frustrated by the need for large amounts of high-quality training data and the inability to verify that results are correct. These technical problems are exacerbated when applying artificial intelligence solutions to organizing and assembling native code scripts as there is no preexisting training data for the correct organization and/or manner of assembly for the native code scripts as well as a manner to directly verify the resulting organization and/or assembly.

Furthermore, the particular transformation of the underlying data that is required (i.e., transforming native script code to natural language summaries) creates an additional novel technical problem. Namely, processing native script code through a natural language processing (NLP) model to generate code summaries would result in code summaries that resemble pseudocode of the native script code as opposed to describing the function that is performed. Additionally, the NLP model would generate code summaries (and thus any resulting comparisons and/or other operations) that are specific to inputted semantic structure, programming languages, and/or code formatting.

To overcome these technical challenges, systems and methods disclosed herein use a bifurcated model architecture. The bifurcated model architecture may comprise a first model that generates code summaries based on native code script, and the second model may compare, de-duplicate, and/or categorize the code summaries into clusters that perform the same or similar functions. That is, the systems and methods may comprise a first model (e.g., a large language model (LLM)) to predict new content (e.g., a code summary for a given native script code). The outputs of the first model are then inputted into an NLP model to compare the code summaries. For example, the first model of the bifurcated architecture performs a crucial pre-processing step that prevents the NLP model from generating cluster descriptions that are specific to semantic structures, programming languages, and/or code formatting.

The system may then use the resulting cluster descriptions to perform a variety of operations. For example, the system may receive user requests for code submissions and/or native script code corresponding to specific functions (e.g., as described by the cluster descriptions). In such cases, users may avoid redundancies in code development by allowing users to search and retrieve code samples. In another example, the system may perform debugging and/or validation assessments across multiple applications by identifying code samples that may perform the same function and thus be susceptible to the same bugs and/or security flaws.

In some aspects, the systems and methods are disclosed for generating code summaries using bifurcated machine learning architectures. For example, the system may receive a first user code submission based on a first native code script for a first application. The system may, in response to receiving the first user code submission, determine a first feature input based on the first user code submission. The system may input the first feature input into a first model, wherein the first model is trained to generate unique code summaries for native code scripts, and wherein each unique code summary of the unique code summaries corresponds to a respective human-readable description of the native code scripts. The system may receive a first output from the first model, wherein the first output comprises a first unique code summary. The system may input the first output into a second model, wherein the second model is trained to select summary clusters for a plurality of unique code summaries, and wherein each summary cluster corresponds to a respective human-readable cluster description. The system may receive, from the second model, a clustering recommendation for the first output, wherein the clustering recommendation indicates a first summary cluster for the first unique code summary. The system may select a cluster description from a plurality of cluster descriptions based on the clustering recommendation.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification. "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
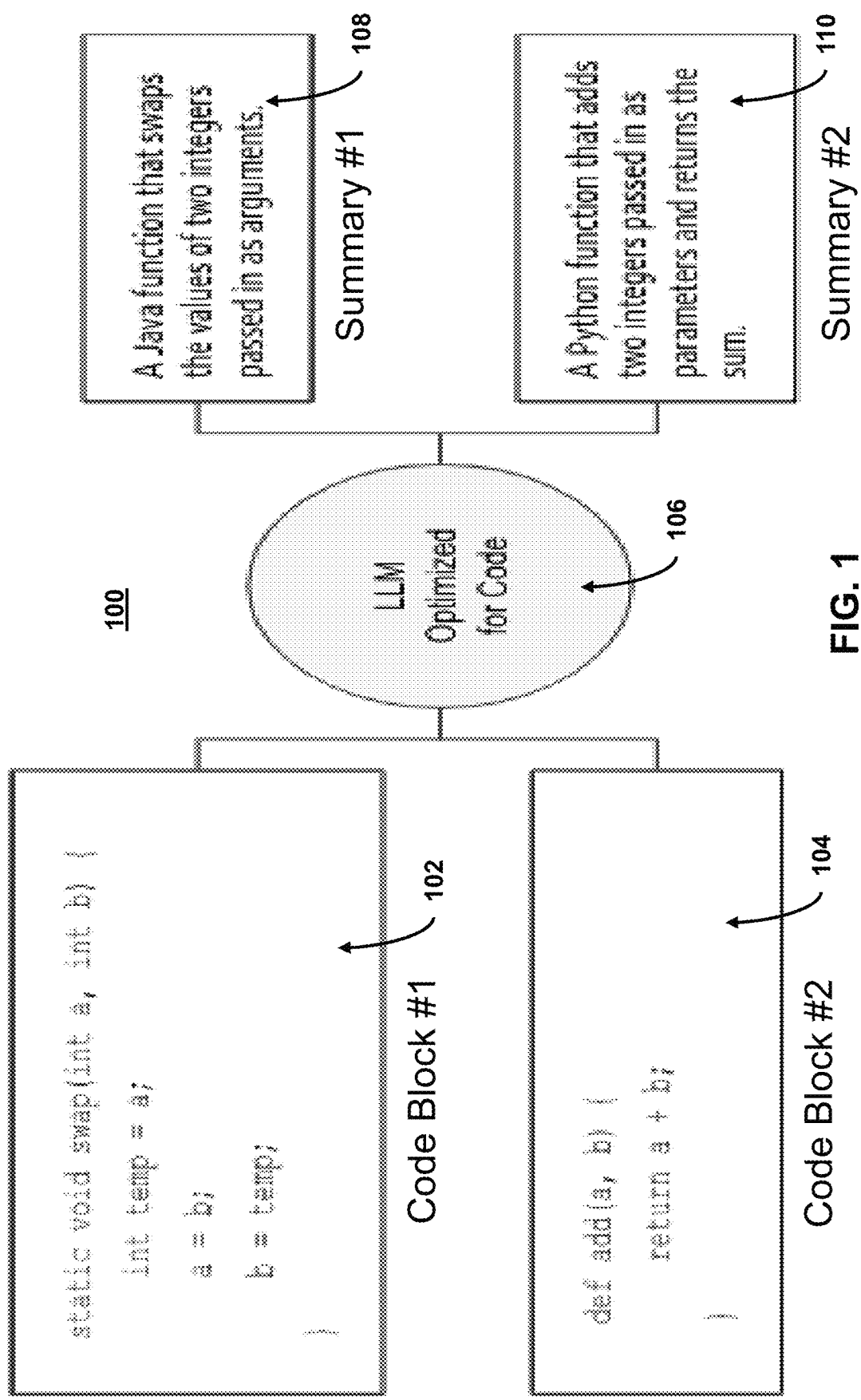
FIG. 1 shows a first model of generating code summaries using bifurcated machine learning architectures, in accordance with one or more embodiments.

FIG. 1 shows a first model of generating code summaries using bifurcated machine learning architectures, in accordance with one or more embodiments. For example, as shown in FIG. 1, the system may receive a first user code submission (e.g., code block 102) and a second user code submission (e.g., code block 104). In response to receiving the one or more user code submissions, the system may use a model (e.g., model 106) to generate code summaries (e.g., code summary 108 and code summary 110).

The code summaries, as well as cluster descriptions determined based on the code summaries, may comprise human-readable content. For example, the human-readable content may be consumed by a user on a user interface. As referred to herein, a "user interface" may comprise a human-computer interaction and communication in a device and may include display screens, keyboards, a mouse, and the appearance of a desktop. For example, a user interface may comprise a way a user interacts with an application or a website.

As referred to herein, "content" should be understood to mean an electronically consumable user asset, such as internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but it can also be part of a live performance. Furthermore, user-generated content may include content created and/or consumed by a user. For example, user-generated content may include content created by another but consumed and/or published by the user. In some embodiments, the content may comprise configuration and document management materials, roadmaps for feature production, and/or centralized communication alerts.

For example, the system may retrieve user code submissions (either automatically or manually) from a codebase. A codebase, or code base, is the complete body of source code for a software program, component, or system. It includes all the source files needed to compile the software into machine code, including configuration files. For example, in software development, a codebase (or code base) is a collection of source code used to build a particular software system, application, or software component. Typically, a codebase includes only human-written source code system files; thus, a codebase usually does not include source code files generated by tools (generated files) or binary library files (object files), as those can be built from the human-written source code. The codebase may be stored in a source control repository in a version control system. A source code repository is a place where large amounts of source code are kept, either publicly or privately. Source code repositories are used most basically for backups and versioning and on multi-developer projects to handle various source code versions and to provide aid in resolving conflicts that arise from developers submitting overlapping modifications.

System 100 may receive a code sample from the codebase in order to generate code summaries (e.g., code summary 108 and code summary 110). The user code submission may be based on a first native code script for a first application. As referred to herein, a "code sample" may comprise a program or sequence of instructions. In some embodiments, the code sample may comprise a program or sequence of instructions that is interpreted or carried out by another program rather than by the computer processor (as a compiled program is). A code sample may comprise one or more instructions and/or relate to one or more functions performed based on the instructions.

In some embodiments, the code sample may comprise a code written in a particular language or native code script. As referred to herein, native code script may refer to the set of instructions or a system of rules written in a particular programming language (e.g., source code). In some embodiments, native code script may refer to source code after it has been processed by a compiler and made ready to run on the computer (e.g., the object code). As described herein, source code may be any collection of text, with or without comments, written using a human-readable programming language, usually as plain text. For example, the source code of a program is specially designed to facilitate the work of computer programmers who specify the actions to be performed by a computer, mostly by writing source code. The source code may be transformed by an assembler or compiler (e.g., of the system) into binary machine code that can be executed by the computer. The machine code is then available for execution at a later time. For example, the machine code may be executed to perform one or more functions of an application feature and/or an application.

For example, as shown in FIG. 1, the system may receive a first user code submission (e.g., code block 102) and a second user code submission (e.g., code block 104). The user code submissions may be written in native code scripts. As such, the user submissions may comprise text with native annotations, semantic structures, programming languages, and/or code formatting. As the system may generate the code summaries, each code summary may be unique. In some embodiments, the system may retrieve existing code summaries from a plurality of available code summaries.

In response to receiving the one or more user code submissions, the system may use a model (e.g., model 106) to generate code summaries (e.g., code summary 108 and code summary 110). Model 106 may comprise one tier of the multitiered model. For example, model 106 may include an artificial neural network, and/or another tier may include an LLM. In some embodiments, system 100 may comprise a first model (e.g., model 106) that may comprise an unsupervised machine learning model, and/or a second model (e.g., model 206 (FIG. 2)) may also comprise an unsupervised machine learning model. It should be noted that, alternatively, the first model (e.g., model 106) may be either a supervised or unsupervised machine learning model, and/or the second model (e.g., model 206 (FIG. 2)) may be a supervised or unsupervised machine learning model.

Model 106 may be structured as an LLM. Model 106 may be a nonlinear model and/or supervised learning model that can perform both classification and regression. Model 106 may use transfer learning and/or distillation. Model 106 may fine-tune an established LLM to be optimized for summarizing units of code into concise, human-readable text. Model 106 may perform these tasks by measuring interactions between variables within large datasets. In some embodiments, model 106 may be used to determine unique code summaries for a feature input (e.g., a feature input based on code block 102). In some embodiments, model 106 may be a general-purpose supervised learning algorithm that the system uses for both classification and regression tasks. For example, model 106 may be an extension of a linear model that is designed to capture interactions between features within high dimensional sparse datasets economically. For example, large language respective models are extensions of linear respective models that model the interactions of variables. Model 106 may map and plot its interactions to a lower dimension. As a result, the number of parameters extends linearly through the dimensions.

Beneficially, model 106 may estimate parameters under very sparse data and therefore scale to fit large datasets. Moreover, model 106 may not rely on training data, resulting in more compact respective models. In one example, model 106 may comprise an LLM, which is a type of artificial intelligence algorithm that uses deep learning techniques and massively large datasets to understand, summarize, generate, and/or predict new content. In some embodiments, the first machine learning model may comprise an LLM. The LLM may be a language model consisting of a neural network with many parameters (typically billions of weights or more) trained on large quantities of unlabeled text using self-supervised learning. In some embodiments, the system may use a transformer, which is a deep learning model that adopts the mechanism of self-attention. The system may use an attention layer to differentially weight the significance of each part of the input (which includes the recursive output) data.

The model may use a transformer architecture. The model may be trained in an unsupervised manner on unannotated text. The system may use a left-to-right transformer that is trained to maximize the probability assigned to the next word in the training data given the previous context. Alternatively, the system may use a bidirectional transformer (as in the example of BERT), which assigns a probability distribution over words given access to both preceding and following context. In addition to the task of predicting the next word or "filling in the blanks," the system may be trained on auxiliary tasks that test their understanding of the data distribution, such as Next Sentence Prediction (NSP), in which pairs of sentences are presented and the model must predict whether they appear side-by-side in the training corpus.

In some embodiments, the feature input may include a vector that describes various information about a user, a user action (which may include user inactions), and/or a current or previous interaction with the user. The system may further select the information for inclusion in the feature input based on a predictive value. The information may be collected actively or passively by the system and compiled from a user profile. For example, the system may generate feature inputs based on native code scripts as well as information about applications to which they relate, related user actions, and/or users or user groups that developed the native code scripts.

In some embodiments, the information (e.g., a user action) may include conversation details such as information about a current session, including a channel or platform, e.g., desktop web, iOS, mobile, a launch page (e.g., the webpage that the application was launched from), a time of launch, and activities in a current or previous session before launching the application. The system may store this information, and all the data about an application may be available in real time via HTTP messages and/or through data streaming from one or more sources (e.g., via an API.).

In some embodiments, the information may include insights about users provided to the application (e.g., via an API) from one or more sources, such as qualitative or quantitative representations (e.g., a percent) of a given activity (e.g., a function) in a given time period (e.g., six months), upcoming actions (e.g., performed by the user, developer, etc.) for a user, information about third parties (e.g., merchants (ranked by the number of transactions) over the last year for the user), etc.

Figure 2:
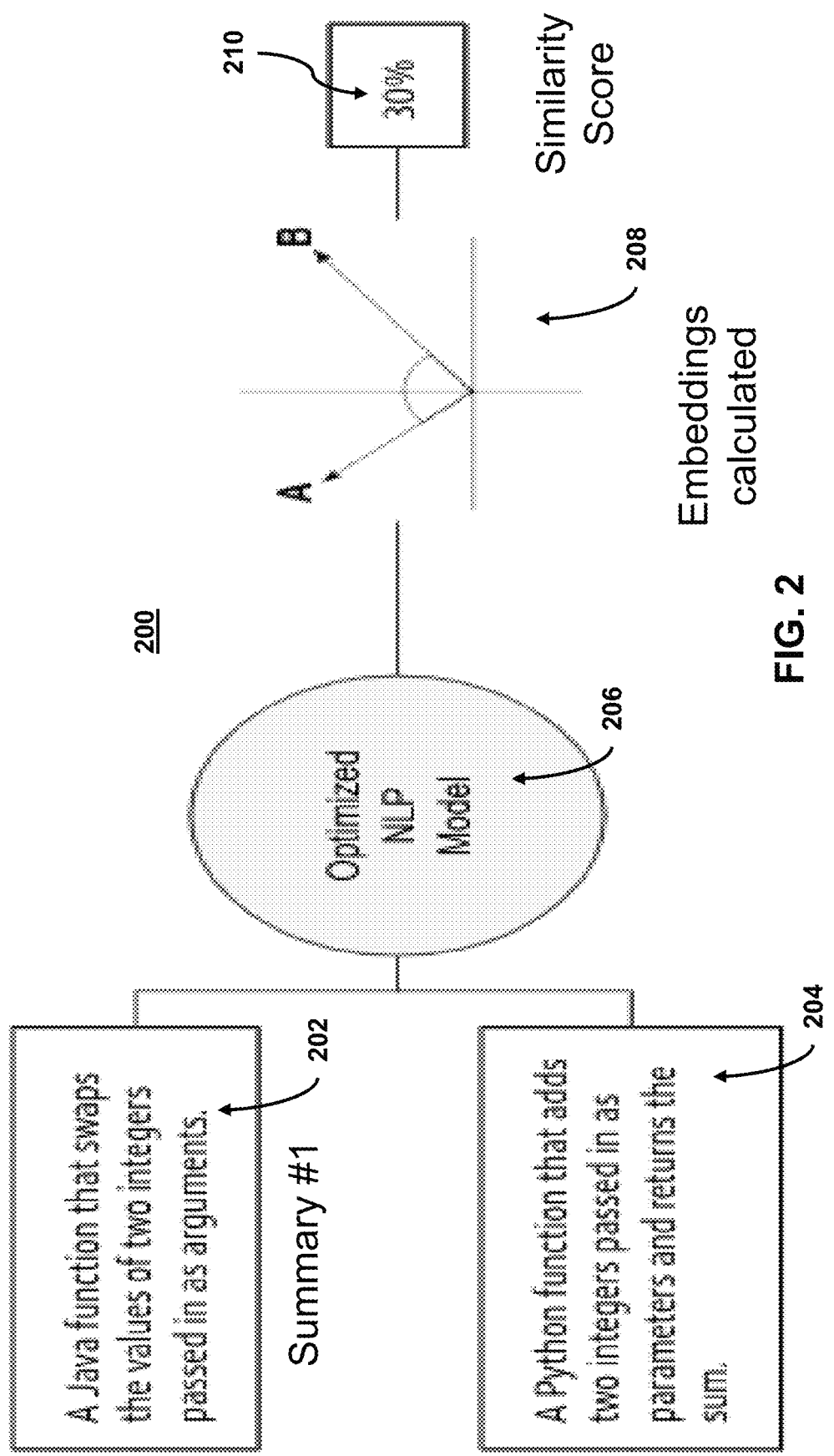
FIG. 2 shows a second model of generating code summaries using bifurcated machine learning architectures, in accordance with one or more embodiments.

Model 106 may include embedding layers at which each feature of the vector of feature input is converted into a dense vector representation. These dense vector representations for each feature are then pooled at a pooling layer to convert the set of embedding vectors into a single vector. The created vector is then used as an input for model 206 (FIG. 2). For example, the output from the first model may then be input into a second model (or second tier). For example, the output may comprise the feature input, a determination of a unique code summary, and/or a specific model (or algorithm) for use in the second tier.

FIG. 2 shows a second model of generating code summaries using bifurcated machine learning architectures, in accordance with one or more embodiments. System 200 may comprise a cluster recommendation based on one or more code summaries (e.g., code summary 202 and code summary 204). In some embodiments, model 206 may predict a cluster description of one or more code summaries. For example, the system may first determine a unique code summary (e.g., using model 106 (FIG. 1)) and then select summary clusters from the unique code summary (e.g., model 206 (FIG. 2)). In some embodiments, the system may determine the cluster of submissions based on the similar feature inputs. For example, the system may cluster submissions based on similar characteristics in the unique code summaries.

In some embodiments, the system may generate the same clustering recommendation for two different user code submissions. To do so, the system may determine a similarity of two code summaries (e.g., similarity 208) and determine a score (e.g., score 210). The score may comprise a qualitative or quantitative metric for the similarity of two code summaries. In some embodiments, the system may compare code summaries using mathematical methods like cosine similarity, which measures the angle between non-zero vectors in multidimensional space as an estimate of similarity. In some embodiments, the system may generate a graph structure linking the source units of code as vertices connected by edges established and weighted by cosine similarity.

Model 206 may be structured as an artificial neural network. Model 206 may include one or more hidden layers. Model 206 may be based on a large collection of neural units (or artificial neurons). Model 206 loosely mimics the manner in which a biological brain works (e.g., via large clusters of biological neurons connected by axons). Each neural unit of a model 206 may be connected with many other neural units of model 206. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function such that the signal must surpass before it propagates to other neural units. Model 206 may be self-learning and trained, rather than explicitly programmed, and can perform significantly better in certain areas of problem solving as compared to traditional computer programs.

During training, an output of model 206 may correspond to a classification of model 206 (e.g., a summary cluster) and an input known to correspond to that classification. In some embodiments, model 206 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 206 may be more free-flowing, with connections interacting in a more chaotic and complex fashion. During testing, an output may indicate whether or not a given input corresponds to a classification of model 206 (e.g., whether or not a given output of model 206 corresponds to a summary cluster).

Figure 3:
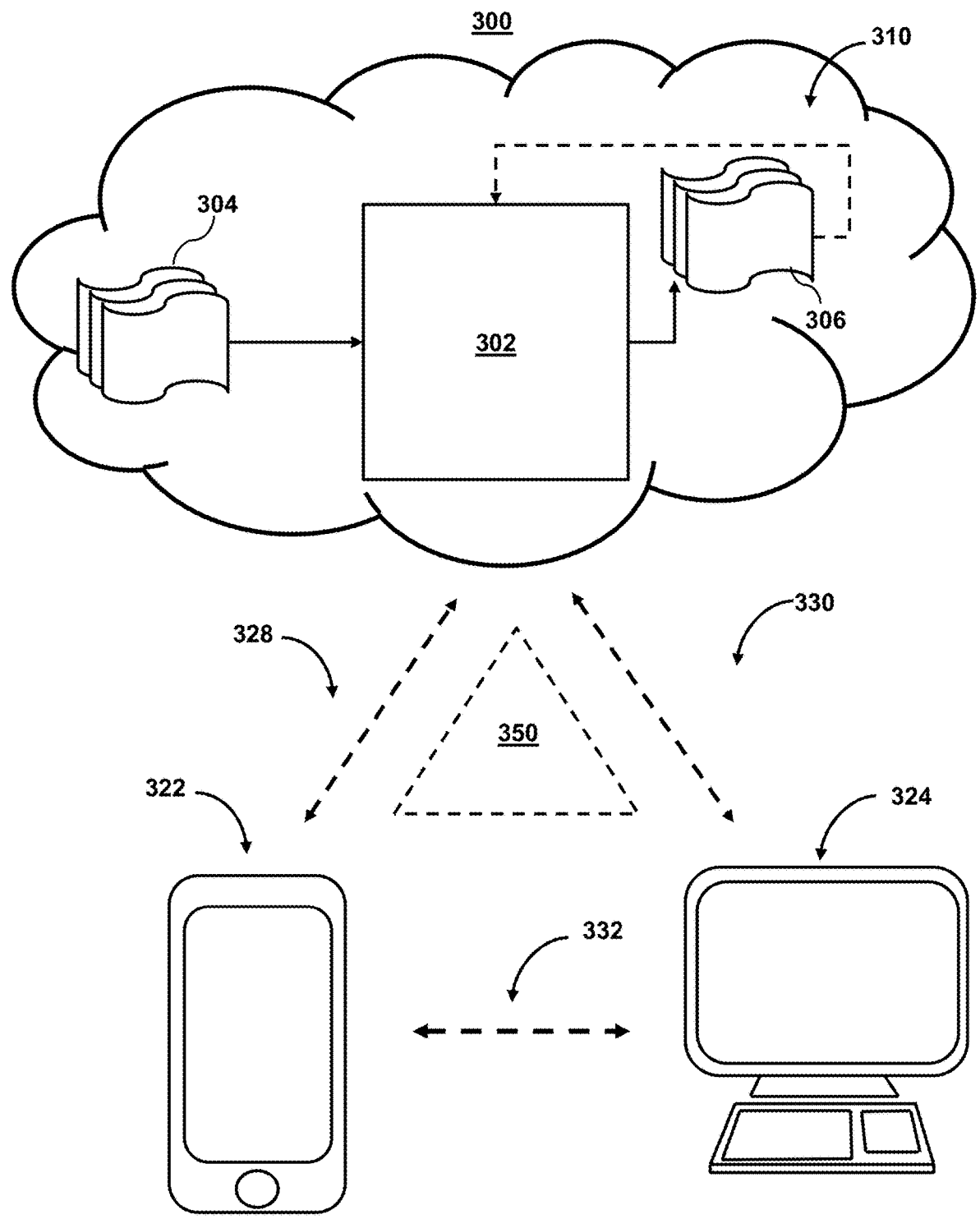
FIG. 3 is an illustrative model architecture using a bifurcated machine learning architecture, in accordance with one or more embodiments.

FIG. 3 shows illustrative components for a system used to generate code summaries, in accordance with one or more embodiments. For example, FIG. 3 may show illustrative components for bifurcated model architectures. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). In some embodiments, model 302 may include one or more components of system 100 (FIG. 1) and/or system 200 (FIG. 2). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a code summary, cluster descriptions, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a code summary, cluster descriptions, etc.).

In some embodiments, the model (e.g., model 302) may automatically perform actions based on outputs 306. In some embodiments, the model (e.g., model 302) may not perform any actions. The output of the model (e.g., model 302) may be used to generate a code summary, cluster descriptions, etc.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
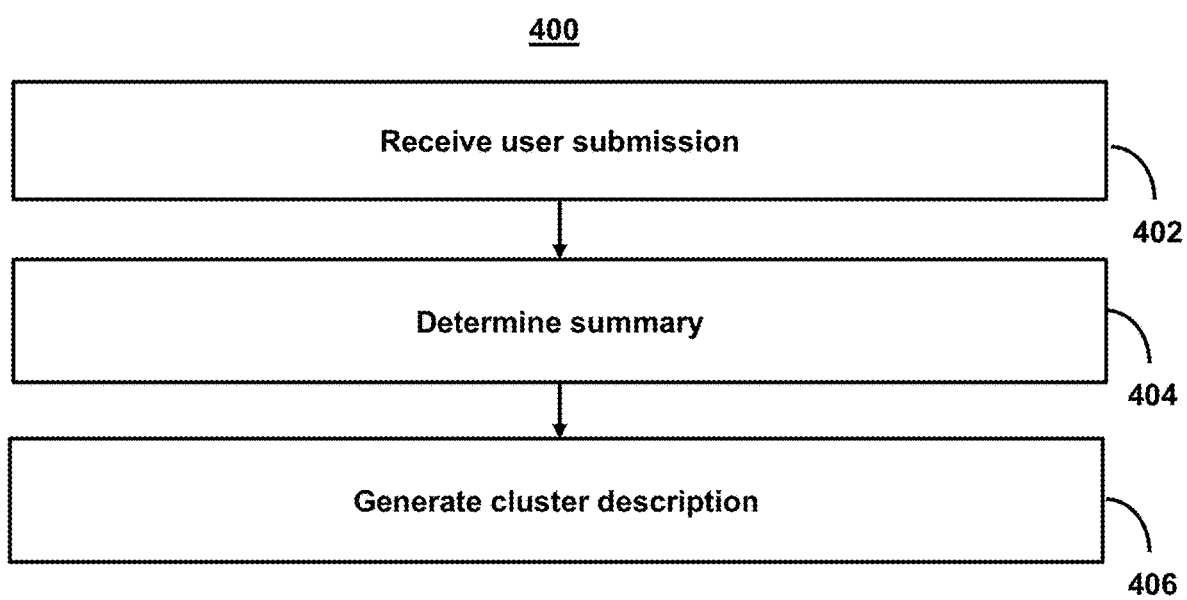
FIG. 4 shows a flowchart of the steps involved in generating code summaries using bifurcated machine learning architectures, in accordance with one or more embodiments.

FIG. 4 shows a flowchart of the steps involved in generating code summaries using bifurcated machine learning architectures, in accordance with one or more embodiments. For example, process 400 may represent the steps taken by one or more devices as shown in FIGS. 1-2 when generating code summaries using bifurcated machine learning architectures (e.g., as shown in FIG. 3).

At step 402, process 400 (e.g., using one or more components in system 200 (FIG. 2)) receives a user submission. For example, the system may receive one or more user inputs to a user interface. The system may then generate one or more code summaries based on that submission. The user input may take various forms, including speech commands, textual inputs, responses to system queries, and/or other user actions (e.g., logging into a mobile application of the system). In each case, the system must aggregate information about the user action, information about the user, and/or other circumstances related to the user action (e.g., time of day, previous user actions, current account settings, etc.) in order to determine a likely submission of the user.

At step 404, process 400 (e.g., using one or more components in system 200 (FIG. 2)) determines a summary of a user submission based on a bifurcated machine learning architecture. For example, the system may first use a first tier of a model (e.g., model 302 (FIG. 3)) to determine a unique code summary of the user's submission. The system may then determine a second tier of a model (e.g., model 302 (FIG. 3)) to determine a summary cluster of the user's submission.

For example, the first model (or first tier) may be selected based on its attributes to generate results with sparse amounts of training data and/or in a supervised manner. For example, the first tier of the machine learning model may comprise an LLM. Using the sparse amount of data, the first model can be used to determine a unique code summary for the user. For example, the first model may group the feature input into one of a plurality of categories of unique code summaries. The second model may then determine a summary cluster based on the output from the first model. Given the two-tiered structure, the second model may be individually trained and/or trained on training data specific to the second model. Additionally, the second model can use an unsupervised learning model (e.g., an artificial neural network). For example, as the initial determination of the unique code summary has been made, the second model can be trained to optimize the precision of the selection of the summary cluster.

For example, the system may generate concise natural language summaries of blocks of code. The model may use transfer learning and/or distillation to generate and/or fine-tune an LLM to be optimized for summarizing units of code into concise, human-readable text. Using this specialized model, the system generates succinct summaries of code that are generalized to the overall functionality regardless of semantic structure, language, or code formatting.

At step 406, process 400 (e.g., using one or more components in system 200 (FIG. 2)) generates a cluster description. For example, by using the bifurcated machine learning architecture, the system may ensure that at least a recommendation is generated based on a submission in the correct cluster. The system may also increase the likelihood that it determines a correct summary cluster of the user. For example, as the initial determination of the unique code summary has been made, the second model can be trained to optimize the precision of the selection of the summary cluster. That is, the output of the second model, and the response generated based on that output, will only be selected from responses from the unique code summary.

For example, the system may use a collection of summaries from different code sources and leverage an NLP model to compare summaries. In some embodiments, the system may use an NLP model like Sentence-BERT to calculate text embeddings (mapping sentences to vectors of real numbers) for each summary. The embeddings may be compared using mathematical methods like cosine similarity, which measures the angle between non-zero vectors in multidimensional space as an estimate of similarity. The result of these two processing steps results in a graph data structure linking the source units of code as vertices connected by edges established and weighted by cosine similarity.

For example, the system may generate a cluster description and present a user submission response to a user selection of the cluster description in a user interface. Using the two models, the system is optimized for their respective tasks, operating in tandem to give clear, readable insights into code. By using the bifurcated approach, the system may develop and deploy models practically and cost-effectively on cloud infrastructure. In adopting this solution, the system saves developers the time and energy needed to dive into code repositories in favor of a readily available way of generating the information they are seeking.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 4.

Figure 5:
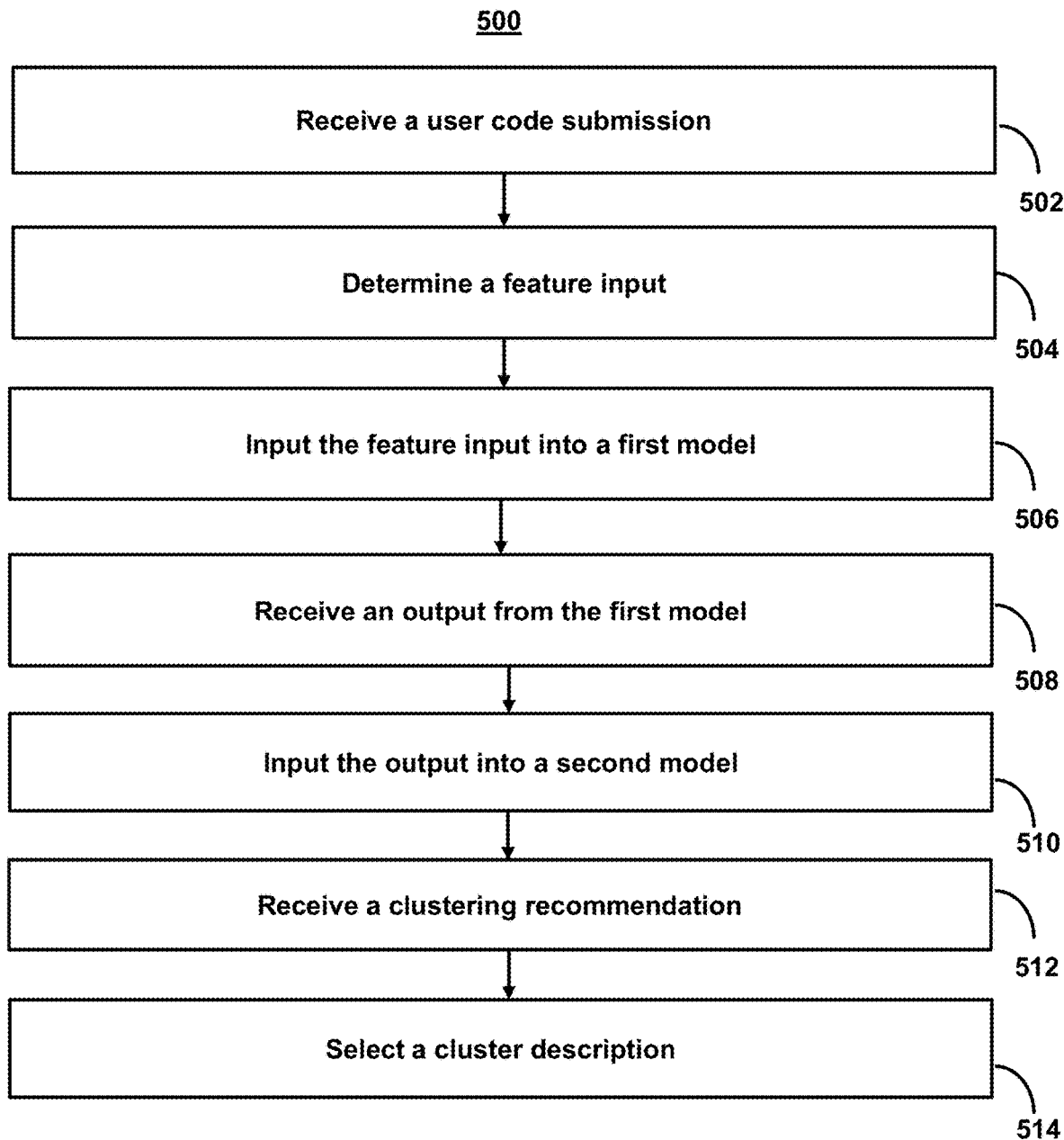
FIG. 5 shows a flowchart of the steps involved in generating code summaries using bifurcated machine learning architectures, in accordance with one or more embodiments.

FIG. 5 shows a flowchart of the steps involved in generating code summaries using bifurcated machine learning architectures, in accordance with one or more embodiments. For example, process 500 may represent the steps taken by one or more devices, as shown in FIGS. 1-3, when generating code summaries.

At step 502, process 500 (e.g., using one or more components in system 300 (FIG. 3)) receives a user code submission. For example, the system may receive a first user code submission based on a first native code script for a first application.

At step 504, process 500 (e.g., using one or more components in system 300 (FIG. 3)) determines a feature input based on the user code submission. For example, the system may, in response to receiving the first user code submission, determine a first feature input based on the first user code submission. The system may generate the feature input based on one or more criteria. For example, the system may generate the feature input based on a conversion detail or information from a user account of the user, a time at which the user interface was launched, and/or a webpage from which the user interface was launched.

In some embodiments, the first machine learning model may comprise an LLM, which may be a language model consisting of a neural network with many parameters (typically billions of weights or more) trained on large quantities of unlabeled text using self-supervised learning. For example, the system may receive unlabeled native code scripts. The system may train a plurality of parameters of the first model based on the native code scripts using unsupervised learning.

In some embodiments, the system may use a transformer, which is a deep learning model that adopts the mechanism of self-attention. The system may use an attention layer to differentially weight the significance of each part of the input (which includes the recursive output) data. For example, the system may process the unlabeled native code scripts through an attention layer. The system may differentially weight a significance of each part of unlabeled native code scripts.

In some embodiments, the model may use a transformer architecture. The model may be trained in an unsupervised manner on unannotated text. The system may use a left-to-right transformer that is trained to maximize the probability assigned to the next word in the training data given the previous context. Alternatively, the system may use a bidirectional transformer (as in the example of BERT), which assigns a probability distribution over words given access to both preceding and following context. In addition to the task of predicting the next word or "filling in the blanks," the system may be trained on auxiliary tasks that test their understanding of the data distribution, such as NSP, in which pairs of sentences are presented and the model must predict whether they appear side-by-side in the training corpus. For example, the system may parse text in the unlabeled native code scripts using a right-to-left transformer. The system may determine a probability that the text corresponds to a word for a unique code summary.

At step 506, process 500 (e.g., using one or more components in system 300 (FIG. 3)) inputs the feature input into a first model. For example, the system may input the first feature input into a first model, wherein the first model is trained to generate unique code summaries for native code scripts, and wherein each unique code summary of the unique code summaries corresponds to a respective human-readable description of the native code scripts.

In some embodiments, the system may receive a first labeled feature input, wherein the first labeled feature input is labeled with a known unique code summary for the first labeled feature input. The system may then train the first model to classify the first labeled feature input with the known unique code summary.

In some embodiments, the system may cluster available unique code summaries into one or more pluralities of unique code summaries. For example, the system may group and/or categorize unique code summaries into unique code summaries based on similarities between the unique code summaries and/or similarities between the feature inputs. For example, two user actions that may appear similar may first be stored in the same unique code summary and then further classified into unique code summaries. This ensures that the system determines submissions with an increased accuracy.

At step 508, process 500 (e.g., using one or more components in system 300 (FIG. 3)) receives an output from the first model. For example, the system may receive a first output from the first model, wherein the first output comprises a first unique code summary. In some embodiments, the first model may be a supervised machine learning model and/or an LLM.

At step 510, process 500 (e.g., using one or more components in system 300 (FIG. 3)) inputs the output into a second model. For example, the system may input the first output into a second model, wherein the second model is trained to select summary clusters for a plurality of unique code summaries, and wherein each summary cluster corresponds to a respective human-readable cluster description. In some embodiments, the second model may be an unsupervised machine learning model and/or an NLP model.

In some embodiments, the system may select the second model, from a plurality of respective model, based on the unique code summary selected from the plurality of unique code summaries, wherein each unique code summary of the unique code summaries corresponds to a respective model from the plurality of machine learning respective model. For example, the system may develop independent respective model, using different algorithms and/or trained on different data, in order to increase the precision at which a summary cluster is determined.

For example, the system may receive a second user code submission based on a second native code script. The system may determine a second feature input for the first model based on the second user code submission in response to receiving the second user code submission. The system may input the second feature input into the first model. The system may receive a different output from the first model, wherein the different output corresponds to a different unique code summary from the plurality of unique code summaries. The system may input the different output into the second model.

At step 512, process 500 (e.g., using one or more components in system 300 (FIG. 3)) receives a clustering recommendation from the second model. For example, the system may receive, from the second model, a clustering recommendation for the first output, wherein the clustering recommendation indicates a first summary cluster for the first unique code summary. In some embodiments, the system may receive a first labeled output from the first model, wherein the first labeled output is labeled with a known summary cluster. The system may then train the second model to classify the first labeled output with the known summary cluster.

In some embodiments, the system may compare code summaries using mathematical methods like cosine similarity, which measures the angle between non-zero vectors in multidimensional space as an estimate of similarity. For example, the system may determine a first embedding for the first unique code summary, wherein the first embedding maps text in the first unique code summary to vectors of real numbers. The system may determine a cosine similarity of the first embedding to embeddings for unique code summaries corresponding to the clustering recommendation.

In some embodiments, the system may generate a graph structure linking the source units of code as vertices connected by edges established and weighted by cosine similarity. For example, the system may determine a first embedding for the first unique code summary, wherein the first embedding maps text in the first unique code summary to vectors of real numbers. The system may determine embeddings for unique code summaries corresponding to the clustering recommendation. The system may generate a graph structure based on vertices of the first embedding and the embeddings.

At step 514, process 500 (e.g., using one or more components in system 300 (FIG. 3)) selects a cluster description based on the clustering recommendation. For example, the system may select a cluster description from a plurality of cluster descriptions based on the clustering recommendation. For example, the system may have one or more potential responses and select one or more of these responses based on the predicted summary cluster of the user. In some embodiments, the system may generate, at the user interface, the first user code submission in response to receiving a request for the cluster description. For example, the system may generate, at a user interface, the first user code submission in response to receiving a request, via the user interface, for the cluster description. In some embodiments, the system may generate the same clustering recommendation for two different user code submissions. For example, the system may receive a second user code submission based on a second native code script for a second application. The system may, in response to receiving the second user code submission, determine a second feature input based on the second user code submission. The system may input the second feature input into the first model. The system may receive a second output from the first model. The system may input the second output into the second model. The system may receive, from the second model, the clustering recommendation for the second output.

In some embodiments, the system may receive user requests for code submissions that perform certain functions. The system may receive user expressions of these functions via the cluster descriptions. In response, the system may search a codebase for user code submissions corresponding to the cluster descriptions. For example, the system may receive, via the user interface, the request for the cluster description. The system may search a codebase for user code submissions corresponding to the cluster description.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating code summaries using bifurcated model architectures.
2. The method of any one of the preceding embodiments, the method comprising: receiving a first user code submission based on a first native code script for a first application; in response to receiving the first user code submission, determining a first feature input based on the first user code submission; inputting the first feature input into a first model, wherein the first model is trained to generate unique code summaries for native code scripts, and wherein each unique code summary of the unique code summaries corresponds to a respective human-readable description of the native code scripts; receiving a first output from the first model, wherein the first output comprises a first unique code summary; inputting the first output into a second model, wherein the second model is trained to select summary clusters for a plurality of unique code summaries, and wherein each summary cluster corresponds to a respective human-readable cluster description; receiving, from the second model, a clustering recommendation for the first output, wherein the clustering recommendation indicates a first summary cluster for the first unique code summary; selecting a cluster description from a plurality of cluster descriptions based on the clustering recommendation; and generating, at a user interface, the first user code submission in response to receiving a request, via the user interface, for the cluster description.
3. The method of any one of the preceding embodiments, further comprising: receiving a second user code submission based on a second native code script for a second application; in response to receiving the second user code submission, determining a second feature input based on the second user code submission; inputting the second feature input into the first model; receiving a second output from the first model; inputting the second output into the second model; and receiving, from the second model, the clustering recommendation for the second output.
4. The method of any one of the preceding embodiments, further comprising: receiving unlabeled native code scripts; training a plurality of parameters of the first model based on the native code scripts using unsupervised learning.
5. The method of any one of the preceding embodiments, further comprising: processing the unlabeled native code scripts through an attention layer; and differentially weighting a significance of each part of unlabeled native code scripts.
6. The method of any one of the preceding embodiments, further comprising: parsing text in the unlabeled native code scripts using a right-to-left transformer; and determining a probability that the text corresponds to a word for a unique code summary.
7. The method of any one of the preceding embodiments, wherein receiving the clustering recommendation for the first output further comprises: determining a first embedding for the first unique code summary, wherein the first embedding maps text in the first unique code summary to vectors of real numbers; and determining a cosine similarity of the first embedding to embeddings for unique code summaries corresponding to the clustering recommendation.
8. The method of any one of the preceding embodiments, wherein receiving the clustering recommendation for the first output further comprises: determining a first embedding for the first unique code summary, wherein the first embedding maps text in the first unique code summary to vectors of real numbers; determining embeddings for unique code summaries corresponding to the clustering recommendation; and generating a graph structure based on vertices of the first embedding and the embeddings.

9. The method of any one of the preceding embodiments, wherein generating the first user code submission in response to receiving the request for the cluster description further comprises: receiving, via the user interface, the request for the cluster description; and searching a codebase for user code submissions corresponding to the cluster description.

10. The method of any one of the preceding embodiments, further comprising selecting the second model, from a plurality of machine learning respective model, based on a unique code summary selected from the plurality of unique code summaries, wherein each unique code summary of the unique code summaries corresponds to a respective model from the plurality of machine learning respective model.

11. The method of any one of the preceding embodiments, further comprising: receiving a second user code submission based on a second native code script; in response to receiving the second user code submission, determining a second feature input for the first model based on the second user code submission; inputting the second feature input into the first model; receiving a different output from the first model, wherein the different output corresponds to a different unique code summary; and inputting the different output into the second model.

12. The method of any one of the preceding embodiments, wherein the first model is an unsupervised machine learning model, and wherein the second model is a supervised machine learning model.

13. The method of any one of the preceding embodiments, wherein the first model is a large language model, and wherein the second model is a natural language processing model.

14. The method of any one of the preceding embodiments, further comprising: receiving a first labeled feature input, wherein the first labeled feature input is labeled with a known unique code summary for the first labeled feature input; and training the first model to classify the first labeled feature input with the known unique code summary.

15. The method of any one of the preceding embodiments, wherein the first feature input is further based on the first application.

16. A non-transitory, computer-readable medium storing instructions that, when executed by a data processing apparatus, cause the data processing apparatus to perform operations comprising those of any of embodiments 1-15.

17. A system comprising: one or more processors; and memory storing instructions that, when executed by the processors, cause the processors to effectuate operations comprising those of any of embodiments 1-15.

18. A system comprising means for performing any of embodiments 1-15.

What is claimed is:

1. A system for generating code summaries using bifurcated model architectures, the system comprising:
one or more processors; and
a non-transitory, computer-readable medium comprising instructions that, when executed by the one or more processors, cause operations comprising:
receiving a first user code submission based on a first native code script for a first application;
receiving a second user code submission based on a second native code script for a second application;
in response to receiving the first user code submission, determining a first feature input based on the first user code submission;
in response to receiving the second user code submission, determining a second feature input based on the second user code submission;
inputting the first feature input into a first model to receive a first output, wherein the first model is trained to generate unique code summaries for native code scripts, and wherein each unique code summary of the unique code summaries corresponds to a respective human-readable description of the native code scripts;
inputting the second feature input into the first model to receive a second output;
inputting the first output and the second output into a second model, wherein the second model is trained to select summary clusters for a plurality of unique code summaries, and wherein each summary cluster corresponds to a respective human-readable cluster description;
receiving, from the second model, a clustering recommendation for the first output and the second output;
selecting a cluster description, from a plurality of cluster descriptions, for the first user code submission and the second user code submission;
receiving, via a user interface, a request for the cluster description; and
generating, at the user interface, the first user code submission and the second user code submission in response to receiving the request.

2. A method for generating code summaries using bifurcated model architectures, the method comprising:
receiving a first user code submission based on a first native code script for a first application;
in response to receiving the first user code submission, determining a first feature input based on the first user code submission;
inputting the first feature input into a first model, wherein the first model is trained to generate unique code summaries for native code scripts, and wherein each unique code summary of the unique code summaries corresponds to a respective human-readable description of the native code scripts;
receiving a first output from the first model, wherein the first output comprises a first unique code summary;
inputting the first output into a second model, wherein the second model is trained to select summary clusters for a plurality of unique code summaries, and wherein each summary cluster corresponds to a respective human-readable cluster description;
receiving, from the second model, a clustering recommendation for the first output, wherein the clustering recommendation indicates a first summary cluster for the first unique code summary;
selecting a cluster description from a plurality of cluster descriptions based on the clustering recommendation; and
generating, at a user interface, the first user code submission in response to receiving a request, via the user interface, for the cluster description.

3. The method of claim 2, further comprising:
receiving a second user code submission based on a second native code script for a second application;
in response to receiving the second user code submission, determining a second feature input based on the second user code submission;
inputting the second feature input into the first model;
receiving a second output from the first model;
inputting the second output into the second model; and
receiving, from the second model, the clustering recommendation for the second output.

4. The method of claim 2, further comprising:
receiving unlabeled native code scripts;
training a plurality of parameters of the first model based on the native code scripts using unsupervised learning.

5. The method of claim 4, further comprising:
processing the unlabeled native code scripts through an attention layer; and
differentially weighting a significance of each part of unlabeled native code scripts.

6. The method of claim 4, further comprising:
parsing text in the unlabeled native code scripts using a right-to-left transformer; and
determining a probability that the text corresponds to a word for a unique code summary.

7. The method of claim 2, wherein receiving the clustering recommendation for the first output further comprises:
determining a first embedding for the first unique code summary, wherein the first embedding maps text in the first unique code summary to vectors of real numbers; and
determining a cosine similarity of the first embedding to embeddings for unique code summaries corresponding to the clustering recommendation.

8. The method of claim 2, wherein receiving the clustering recommendation for the first output further comprises:
determining a first embedding for the first unique code summary, wherein the first embedding maps text in the first unique code summary to vectors of real numbers;
determining embeddings for unique code summaries corresponding to the clustering recommendation; and
generating a graph structure based on vertices of the first embedding and the embeddings.

9. The method of claim 2, wherein generating the first user code submission in response to receiving the request for the cluster description further comprises:
receiving, via the user interface, the request for the cluster description; and
searching a codebase for user code submissions corresponding to the cluster description.

10. The method of claim 2, further comprising selecting the second model, from a plurality of machine learning respective model, based on a unique code summary selected from the plurality of unique code summaries, wherein each unique code summary of the unique code summaries corresponds to a respective model from the plurality of machine learning respective model.

11. The method of claim 2, further comprising:
receiving a second user code submission based on a second native code script;
in response to receiving the second user code submission, determining a second feature input for the first model based on the second user code submission;
inputting the second feature input into the first model;
receiving a different output from the first model, wherein the different output corresponds to a different unique code summary; and
inputting the different output into the second model.

12. The method of claim 2, wherein the first model is an unsupervised machine learning model, and wherein the second model is a supervised machine learning model.

13. The method of claim 2, wherein the first model is a large language model, and wherein the second model is a natural language processing model.

14. The method of claim 2, further comprising:
receiving a first labeled feature input, wherein the first labeled feature input is labeled with a known unique code summary for the first labeled feature input; and
training the first model to classify the first labeled feature input with the known unique code summary.

15. The method of claim 2, wherein the first feature input is further based on the first application.

16. A non-transitory, computer-readable medium comprising of instructions that, when executed by one or more processors, cause operations comprising:
receiving a first user code submission based on a first native code script for a first application;
in response to receiving the first user code submission, determining a first feature input based on the first user code submission, wherein the first feature input is input into a first model, wherein the first model is trained to generate unique code summaries for native code scripts, and wherein each unique code summary of the unique code summaries corresponds to a respective human-readable description of the native code scripts;
receiving a first output from the first model, wherein the first output comprises a first unique code summary;
inputting the first output into a second model, wherein the second model is trained to select summary clusters for a plurality of unique code summaries, and wherein each summary cluster corresponds to a respective human-readable cluster description;
receiving, from the second model, a clustering recommendation for the first output, wherein the clustering recommendation indicates a first summary cluster for the first unique code summary; and
selecting a cluster description from a plurality of cluster descriptions based on the clustering recommendation.

17. The non-transitory, computer-readable medium of claim 16, wherein the instructions further cause operations comprising:
receiving a second user code submission based on a second native code script for a second application;
in response to receiving the second user code submission, determining a second feature input based on the second user code submission;
inputting the second feature input into the first model;
receiving a second output from the first model;
inputting the second output into the second model; and
receiving, from the second model, the clustering recommendation for the second output.

18. The non-transitory, computer-readable medium of claim 16, wherein the instructions further cause operations comprising:
receiving unlabeled native code scripts;
training a plurality of parameters of the first model based on the native code scripts using unsupervised learning.

19. The non-transitory, computer-readable medium of claim 18, wherein the instructions further cause operations comprising:
processing the unlabeled native code scripts through an attention layer; and
differentially weighting a significance of each part of the unlabeled native code scripts.

20. The non-transitory, computer-readable medium of claim 18, wherein the instructions further cause operations comprising:
parsing text in the unlabeled native code scripts using a right-to-left transformer; and
determining a probability that the text corresponds to a word for a unique code summary.

* * * * *